United States Patent
Hung

(10) Patent No.: US 7,406,343 B2
(45) Date of Patent: Jul. 29, 2008

(54) HINGE AND MOBILE PHONE WITH THE HINGE

(75) Inventor: Kuo-Wei Hung, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 585 days.

(21) Appl. No.: 11/200,429

(22) Filed: Aug. 9, 2005

(65) Prior Publication Data

US 2007/0037616 A1    Feb. 15, 2007

(51) Int. Cl.
*H04M 1/00* (2006.01)

(52) U.S. Cl. .............. 455/575.3; 455/575.1; 455/550.1

(58) Field of Classification Search ............. 455/575.3, 455/575.1, 550.1, 90.3
See application file for complete search history.

(56) References Cited

U.S. PATENT DOCUMENTS

| | | | |
|---|---|---|---|
| 5,841,635 A * | 11/1998 | Sadler et al. ................ 361/749 |
| 7,055,219 B2 * | 6/2006 | Shiba ........................ 16/367 |
| 7,184,805 B2 * | 2/2007 | Cho et al. ............... 455/575.4 |
| 7,346,375 B2 * | 3/2008 | Sato et al. ............... 455/575.3 |
| 2003/0040288 A1 * | 2/2003 | Kang et al. .................. 455/90 |
| 2004/0192422 A1 | 9/2004 | Watanabe |
| 2004/0202316 A1 * | 10/2004 | Abe et al. ................... 379/451 |
| 2005/0046726 A1 * | 3/2005 | Hojo et al. ............. 348/333.06 |
| 2005/0208984 A1 * | 9/2005 | Tang ....................... 455/575.3 |
| 2006/0048338 A1 * | 3/2006 | Lowry et al. .................. 16/367 |
| 2006/0111160 A1 * | 5/2006 | Lin et al. ................. 455/575.3 |
| 2006/0135225 A1 * | 6/2006 | Lin et al. ................. 455/575.3 |
| 2007/0060216 A1 * | 3/2007 | Huang et al. ............. 455/575.3 |

* cited by examiner

*Primary Examiner*—Dwayne Bost
*Assistant Examiner*—Huy D Nguyen

(57) ABSTRACT

A mobile phone has a cover with a first bearing extending parallel with the cover, a body with a second bearing at a corner thereof and extending perpendicular thereto, and a hinge rotationally coupling the cover and the body. The hinge includes a crankshaft that has a transverse shaft and a vertical shaft extending perpendicularly from an end of the transverse shaft, a first cam assembly disposed on the transverse shaft, and a second cam assembly disposed on the vertical shaft. The first cam assembly together with the transverse shaft is retained by the first bearing to enable the cover to be rotatable relative to the body about a transverse axis. The second cam assembly together with the vertical shaft is retained by the second bearing to enable the cover to be rotatable relative to the body about a vertical axis. Thus the cover can be firstly rotated vertically 180 degrees about the transverse axis and then rotated horizontally 180 degrees about the vertical axis to a position where the cover is side by side with the body.

12 Claims, 8 Drawing Sheets

HINGE AND MOBILE PHONE WITH THE HINGE

BACKGROUND OF THE INVENTION

1. Field of the Invention

The present invention generally relates to a hinge, and more particularly, to a hinge adapted to be used in a mobile phone and a mobile phone using the hinge.

2. The Related Art

At present, media mobile phones are popularized. A user can watch a video, play a game and surf Internet by the media mobile phone. In order to carry conveniently for the user, the size of the media mobile phone is often small. Therefore the size of the display panel of the media mobile phone is also small. This is inconvenient for the user to use.

In order to increase the size of the display panel and carry conveniently, a prior media mobile phone disclosed in Pub. No. US2004/0192422 by Watanable et al., published on Sep. 30, 2004, includes a cover and a base. A hinge connects the cover with the base pivotally for opening or closing the media mobile phone. Hence, when the media mobile phone is not in use, the cover is overlapped on the base for being carried conveniently. A display panel is arranged on the cover for increasing its size.

The hinge has a mount. A first traverse shaft and a second traverse shaft extend from opposite sides of the mount, and the two traverse shafts are connected with the cover. A perpendicular shaft extends from the mount perpendicular to the traverse shafts. A fixing seat is arranged on the middle section of one end of the base to support the perpendicular shaft. A flexible plate is wound around the perpendicular shaft, and one terminal of the flexible plate passes through the mount and one of the two traverse shafts in order, and then is assembled with the cover.

The cover of the media mobile phone can be rotated a certain angle around the two traverse shafts to deform the flexible plate, and the cover can also be rotated 180 degree around center axis of the perpendicular shaft after the cover being rotated around the two traverse shafts. After the cover is rotated 180 degree around the center axis of the perpendicular shaft, the flexible plate restores elastically to urge the cover to overlap on the base.

According to the forgoing description, therefore, the assembly of the hinge is complicated. Furthermore, with the structure that the traverse shafts extend from opposites sides of the mount and the perpendicular shaft thus can only be fixed in the middle of one end of the base, as a result, the cover can only be stacked on the base, but can not be opened side by side with the base.

SUMMARY OF THE INVENTION

According to an aspect of the present invention, a hinge which is adapted for rotationally coupling a cover and a body of a mobile phone is provided. The hinge comprises a crankshaft, a first cam assembly, and a second cam assembly. The crankshaft has a transverse shaft and a vertical shaft extending perpendicularly from an end of the transverse shaft. The transverse shaft has a first keyed surface. The vertical shaft has a second keyed surface. The first cam assembly comprises a first cannular cam, a first cannular cam follower, and a first resilient means, all of which are disposed on the transverse shaft in order. The first cam assembly together with the transverse shaft is assembled with the cover. The first cannular cam has a third keyed surface on an outer wall thereof so as to be keyed to the cover. The first cannular cam follower has a fourth keyed surface on an inner wall thereof to engage with the first keyed surface, thereby keying the first cannular cam follower to the transverse shaft. The first resilient means resiliently biases the first cannular cam and the first cannular cam follower into engagement. The second cam assembly comprises a second cannular cam, a second cannular cam follower, and a second resilient means, all of which are disposed on the vertical shaft in order. The second cannular cam is fixed to the body. The second cannular cam follower has a fifth keyed surface on an inner wall thereof to engage with the second keyed surface, thereby keying the second cannular cam follower to the vertical shaft. The second resilient means resiliently biases the second cannular cam and the second cannular cam follower into engagement.

According to another aspect of the present invention, a mobile phone with a hinge is provided. The mobile phone comprises a cover with a first display panel thereon and a body. The hinge rotationally couples the cover and the body. The cover has a first bearing that defines a first cavity therein extending parallel with the first display panel. The body has a second bearing at a corner thereof that defines a second cavity therein extending perpendicular to the body. The hinge comprises a crankshaft, a first cam assembly, and a second cam assembly. The crankshaft has a transverse shaft and a vertical shaft extending perpendicularly from an end of the transverse shaft. The transverse shaft has a first keyed surface. The vertical shaft has a second keyed surface. The first cam assembly comprises a first cannular cam, a first cannular cam follower, and a first resilient means, all of which are disposed on the transverse shaft in order. The first cam assembly together with the transverse shaft is retained by the first cavity of the cover. The first cannular cam has a third keyed surface on an outer wall thereof so as to be keyed to the first cavity. The first cannular cam follower has a fourth keyed surface on an inner wall thereof to engage with the first keyed surface, thereby keying the first cannular cam follower to the transverse shaft. The first resilient means resiliently biases the first cannular cam and the first cannular cam follower into engagement. The second cam assembly comprises a second cannular cam, a second cannular cam follower, and a second resilient means, all of which are disposed on the vertical shaft in order. The second cam assembly together with the vertical shaft is retained by the second cavity of the body. The second cannular cam is fixed to the body. The second cannular cam follower has a fifth keyed surface on an inner wall thereof to engage with the second keyed surface, thereby keying the second cannular cam follower to the vertical shaft. The second resilient means resiliently biases the second cannular cam and the second cannular cam follower into engagement.

According to the invention there is no winding operation to assemble the hinge, but disposing the first and second cam assemblies on the crankshaft respectively. Therefore, the hinge is simple to assemble.

The first cam assembly and the transverse shaft enable the cover to be rotatable about a transverse axis. The second cam assembly and the vertical shaft enable the cover to be rotatable about a vertical axis. Due to the second cam assembly and the vertical shaft being assembled with the body at a corner thereof, the cover can be opened side by side with the body.

Other objects, advantages and novel features of the invention will become more apparent from the following detailed description of a preferred embodiment thereof when taken in conjunction with the accompanying drawings, wherein:

DETAILED DESCRIPTION OF THE PREFERRED EMBODIMENT

Figure 1:
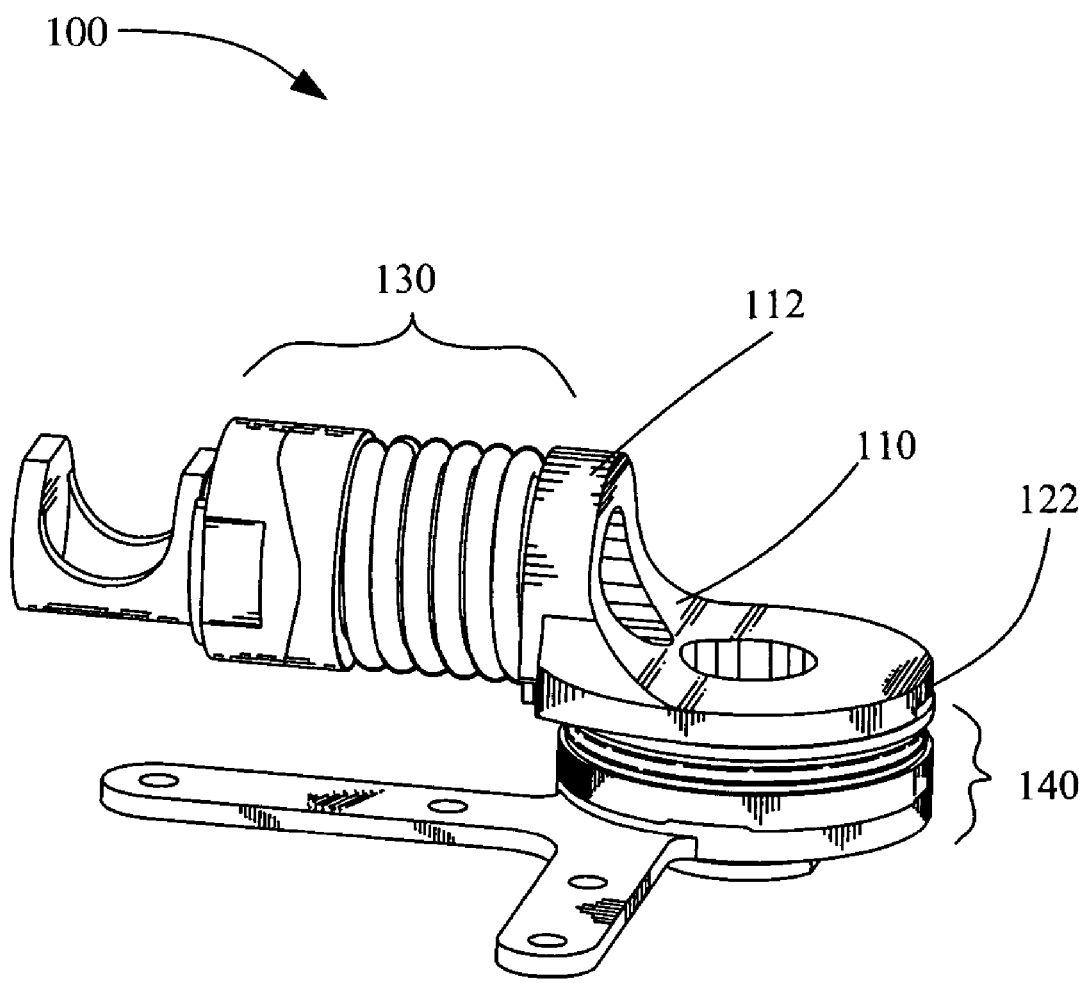
FIG. 1 is an assembled perspective view of a hinge according to the present invention.

With reference to FIG. 1, a hinge according to the present invention comprises a crankshaft 110 which has a transverse shaft 112 and a vertical shaft 122 extending perpendicularly from an end of the transverse shaft 112, a first cam assembly 130 disposed on the transverse shaft 112, and a second cam assembly 140 disposed on the vertical shaft 122.

Figure 2:
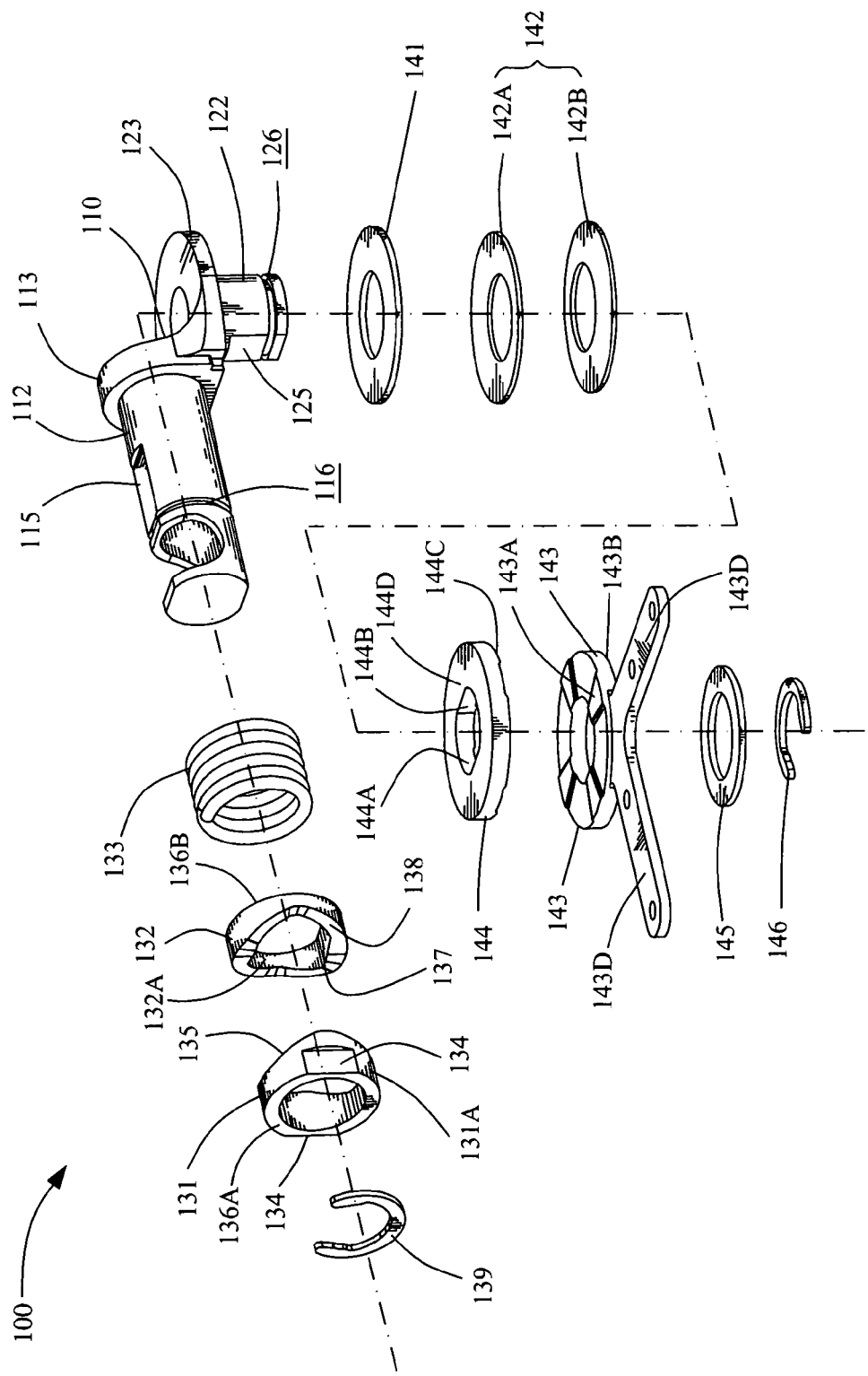
FIG. 2 is an exploded perspective view of the hinge shown in FIG. 1.

Referring to FIG. 2 together with FIG. 1. The transverse shaft 112 forms a first pedestal 113 at an end thereof joining to the vertical shaft 122 with a diameter larger than the diameter of the transverse shaft 112. Outer wall of the transverse shaft 112 is partially cut to form a pair of first keyed surfaces 115 at an upper and an opposite lower sides thereof and parallel with the axis of the transverse shaft 112. A first groove 116 is defined in and around the transverse shaft 112 at an opposite end opposite to the first pedestal 113.

The vertical shaft 122 forms a second pedestal 123 at an end thereof joining to the transverse shaft 112 with a diameter larger than the diameter of the vertical shaft 122. Outer wall of the vertical shaft 122 is partially cut to form a pair of second keyed surfaces 125 at a left and an opposite right sides thereof and parallel with the axis of the vertical shaft 122. A second groove 126 is defined in and around the vertical shaft 122 at an opposite end opposite to the second pedestal 123.

The first cam assembly 130 comprises a first cannular cam 131, a first cannular cam follower 132, a first resilient means 133, and a first positioning spacer 139. The first positioning spacer 139 is C-shaped. The first cannular cam 131 has an outer wall 131A. The outer wall 131A is partially cut to form a pair of third keyed surfaces 134 parallel with the axis of the first cannular cam 131. At one side of the first cannular cam 131 is a first cam profile 135, while a first flat surface 136A is at the other side opposite to the first cam profile 135. The first cannular cam follower 132 has an inner wall 132A with a pair of fourth keyed surfaces 137 formed thereon for mating with the first keyed surfaces 115 of the transverse shaft 112. At one side of the first cannular cam follower 132 is a first complementary cam profile 138, while at its opposite side is a second flat surface 136B. Preferably, the first resilient means 133 is a coiled spring. During assembly the first resilient means 133 is disposed on the transverse shaft 112 first, followed by the first cannular cam follower 132 and the first cannular cam 131. Finally, the first positioning spacer 139 is wedged in the first groove 116 of the transverse shaft 112 and propped against the first flat surface 136A of the first cannular cam follower 132, thereby positioning the first cannular cam 131, the first cannular cam follower 132 and the first resilient means 133 between the first pedestal 113 and the first positioning spacer 139. After assembly, the first cam profile 135 rests against the first complementary cam profile 138. The first resilient means 133 makes contact throughout the first pedestal 113 and the second flat surface 136B of the first cannular cam follower 132 to distribute axial forces thereon to resiliently bias the first cannular cam follower 132 and the first cannular cam 131 into engagement.

After assembly, the first cannular cam 131 is keyed to a cover of a mobile phone by the third keyed surfaces 134 as will be described in greater detail hereinafter. As a result, the first cannular cam 131 rotates with the cover and rotationally urges the first complementary cam profile 138 of the first cannular cam follower 132. The fourth keyed surfaces 137 of the first cannular cam follower 132 key to the first keyed surfaces 115 of the transverse shaft 112, which restricts the first cannular cam follower 132 from rotation, while allows the first cannular cam follower 132 to axially slide on the transverse shaft 112 in response to compressive forces of the first resilient means 133 or urging forces of the first cannular cam 131.

The second cam assembly 140 comprises a ring spacer 141, a second resilient means 142, a second cannular cam 143, a second cannular cam follower 144, a bearing gasket 145, and a second positioning spacer 146. The second positioning spacer 146 is C-shaped. At one side of the second cannular cam 143 is a second cam profile 143A, while a third flat surface 143B is at the other side opposite to the second cam profile 143A. The second cannular cam 143 forms a pair of mounting legs 143D for being fixed to a body of the mobile phone as will be described in greater detail hereinafter. The second cannular cam follower 144 has an inner wall 144A with a pair of fifth keyed surfaces 144B formed thereon for mating with the second keyed surfaces 115 of the vertical shaft 122. At one side of the second cannular cam follower 144 is a second complementary cam profile 144C, while at its opposite side is a fourth flat surface 144D. Preferably, the second resilient means 142 includes a pair of resilient spacers 142A, 142B, one of which is dome-shaped, and the other of which is inverted dome-shaped. The resilient spacers 142A, 142B with such shapes are deformable to provide compressive forces. During assembly the ring spacer 141, the second resilient means 142, the second cannular cam follower 144, the second cannular cam 143, and the bearing gasket 145 are disposed on the vertical shaft 122 in order. Finally, the second positioning spacer 146 is wedged in the second groove 126 of the vertical shaft 112 and propped against the third flat surface 143B of the second cannular cam follower 143 together with the bearing gasket 145, thereby positioning the second cannular cam 143, the second cannular cam follower 144, the second resilient means 142 and the ring spacer 141 between the second pedestal 123 and the second positioning spacer 146. After assembly, the second cam profile 143A rests against the second complementary cam profile 144C. The ring spacer 141 makes contact throughout the second pedestal 123, and the second resilient means 142 makes contact throughout the ring spacer 141 and the fourth flat surface 144D of the second cannular cam follower 144 to distribute axial forces thereon to resiliently bias the second cannular cam follower 144 and the second cannular cam 143 into engagement.

After assembly, the fifth keyed surfaces 144B of the second cannular cam follower 144 key to the second keyed surfaces 125 of the vertical shaft 122, which allows the second cannular cam follower 144 to rotate with the vertical shaft 122 and to axially slide on the vertical shaft 122 in response to compressive forces of the second resilient means 142.

Figure 3:
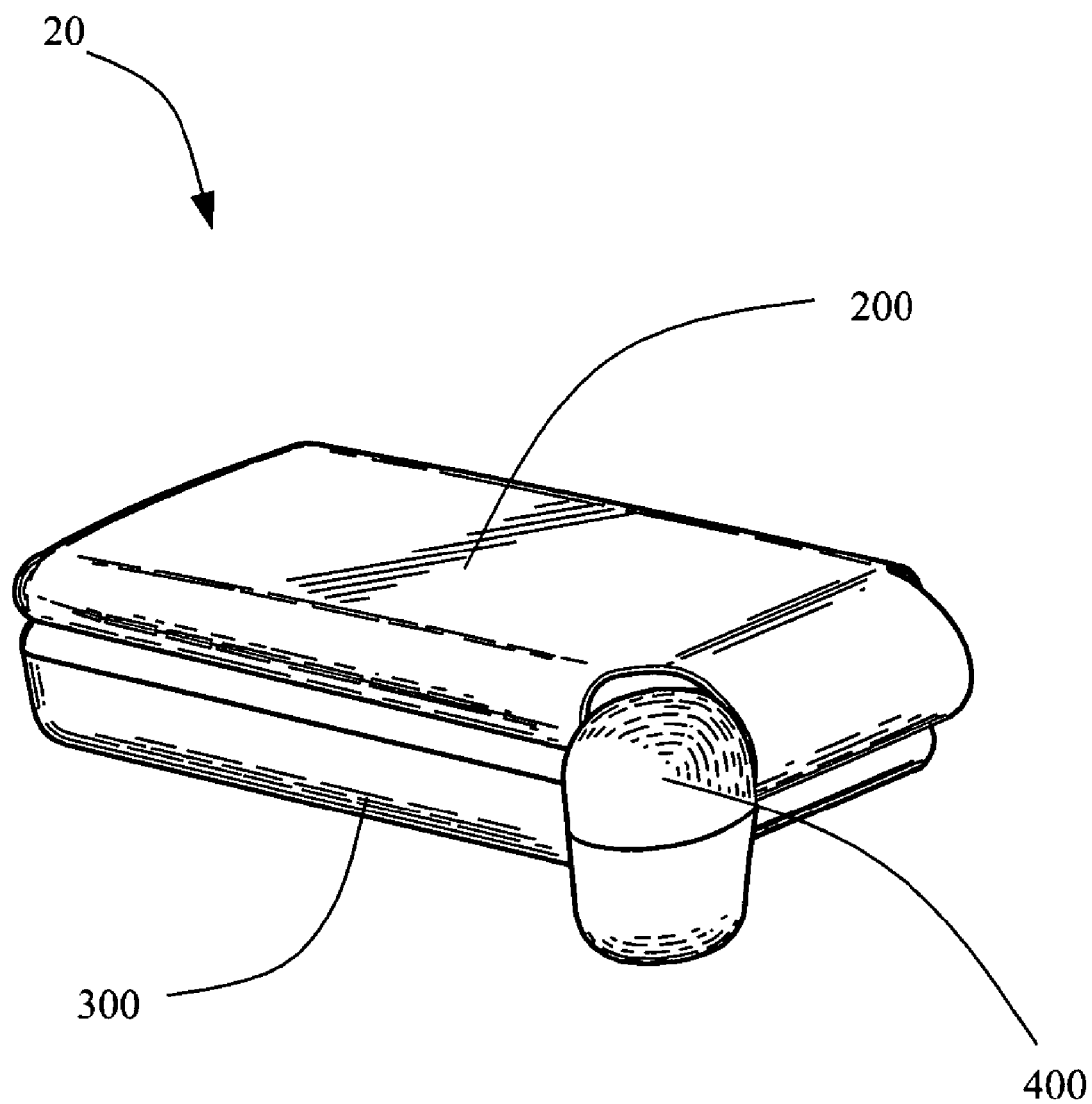
FIG. 3 is an assembled perspective view of a mobile phone using the hinge shown in FIG. 1.

Referring to FIG. 3, a mobile phone 20 using the hinge 100 of the present invention is shown. The mobile phone 20 has a cover 200 and a body 300. The hinge 100 rotationally couples the cover 200 and the body 300.

Figure 5:
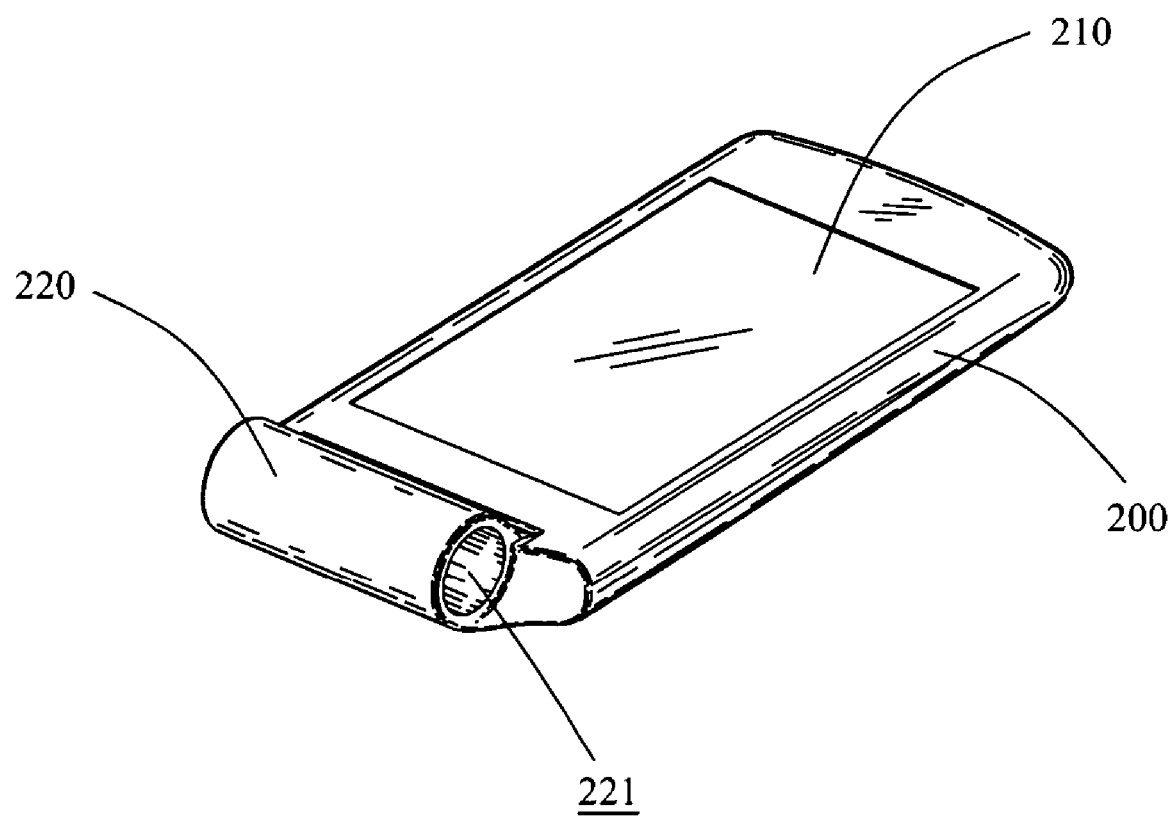
FIG. 5 is a perspective view of a cover of the mobile phone shown in FIG. 3.

Referring to FIG. 5, the cover 200 has a first display panel 210 thereon. A first bearing 220 is integrally molded at one end of the cover 200. A first cavity 221 is defined in the first bearing 220 extending parallel with the first display panel 210.

Figure 6:
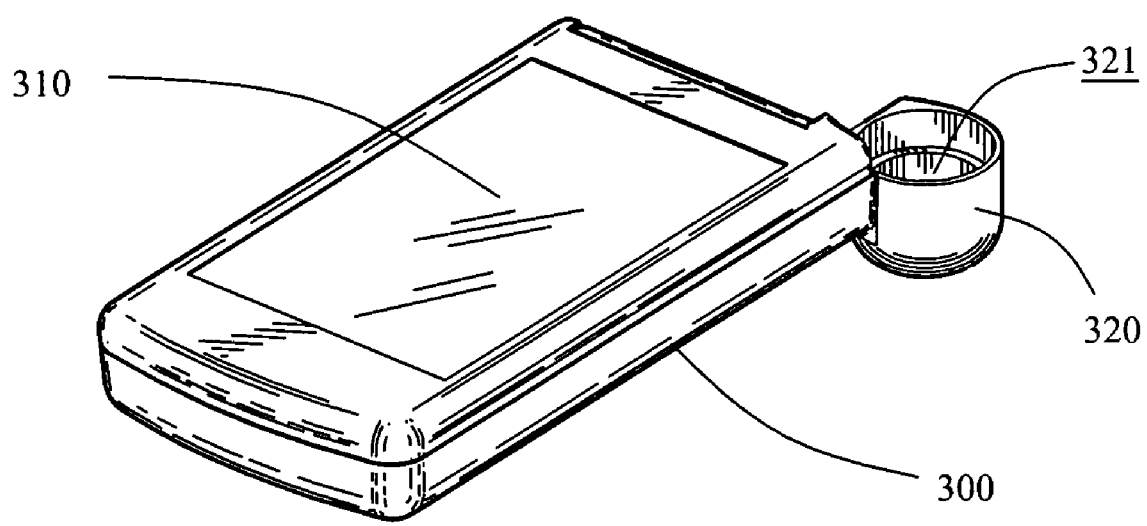
FIG. 6 is a perspective view of a body of the mobile phone shown in FIG. 3.

Referring to FIG. 6, the body 300 has a second display panel 310 thereon. A second bearing 320 is integrally molded at corner thereof. A second cavity 321 is defined in the second bearing 320 extending perpendicular to the second display panel 310.

Figure 4:
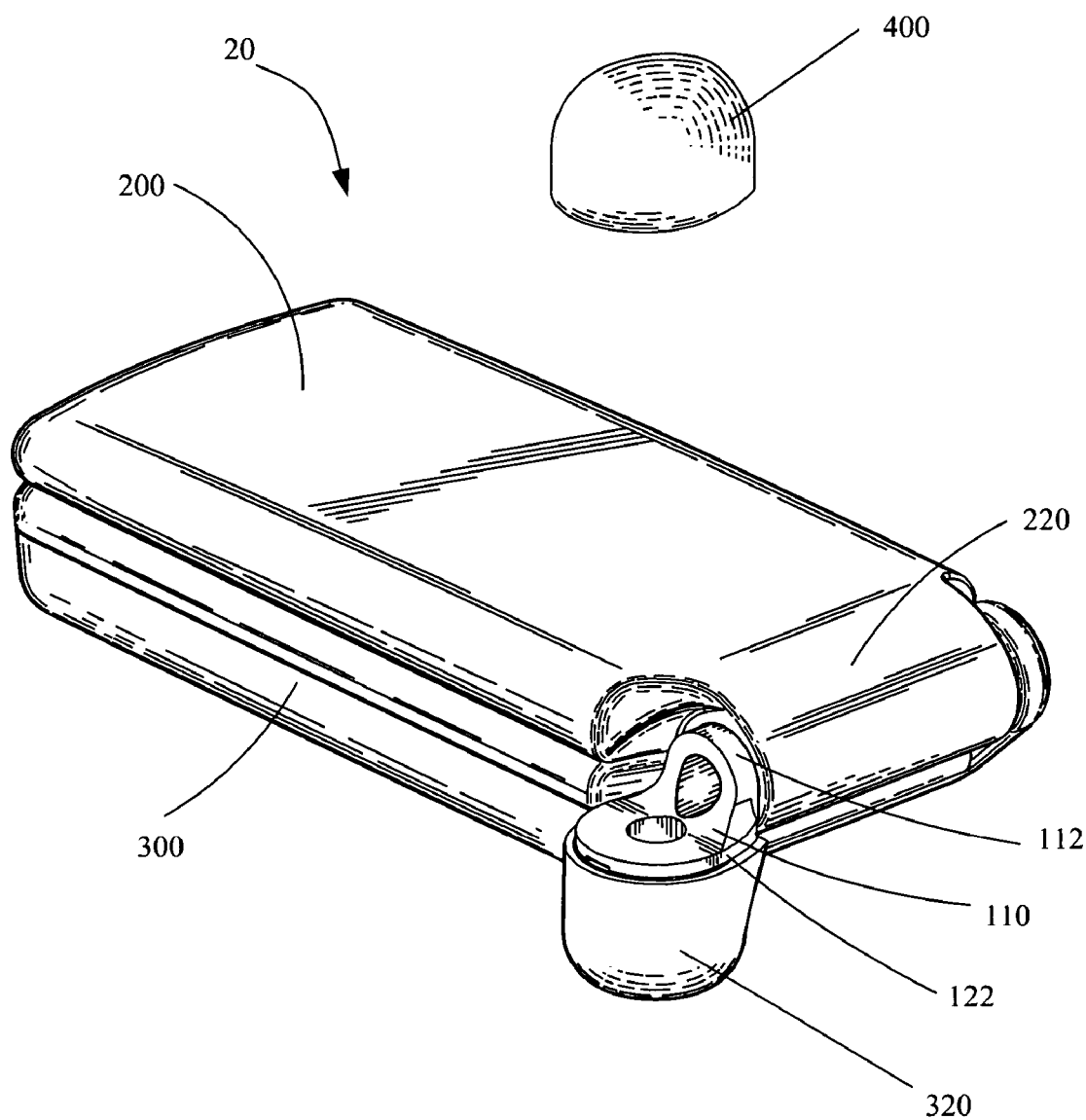
FIG. 4 is a perspective view of the mobile phone with a cap thereof removed therefrom.

Referring to FIGS. 1, 3 and 4. In assembly of the mobile phone 20, the transverse shaft 112 together with the first cam assembly 130 is inserted in the first cavity 221 of the first bearing 220. The first cannular cam 131 is keyed to the first cavity 221 by the third keyed surfaces 134. Thus the first cannular cam 131 rotates with the cover 200 around the transverse shaft 112, namely, a transverse axis, while the transverse shaft 112 remains stationary, and the first cannular cam follower 132 slides along the transverse shaft 112. The first cam profile 135 and the first complementary cam profile 138 are chosen to position the cover 200 in one or more positions while vertically rotating the cover 200. The vertical shaft 122 together with the second cam assembly 140 is inserted in the second cavity 321 of the second bearing 320. The second cannular cam 143 is fixed to the body 300 by mounting the pair of mounting legs 143D on the body 300. The vertical shaft 122 rotates in the second cavity 321. The rotation of the vertical shaft 122 make the cover 200 to rotate about the vertical shaft 122, namely, a vertical axis. The second cannular cam follower 144 rotates with and slides along the vertical shaft 122. The second cam profile 143A and the second complementary cam profile 144C are chosen to position the cover 200 in one or more positions while horizontally rotating the cover 200. Referring again to FIGS. 3 and 4, the mobile phone further comprises a cap 400 covered on the exposed portion of the hinge 100, thereby hiding the hinge 100.

Figure 7:
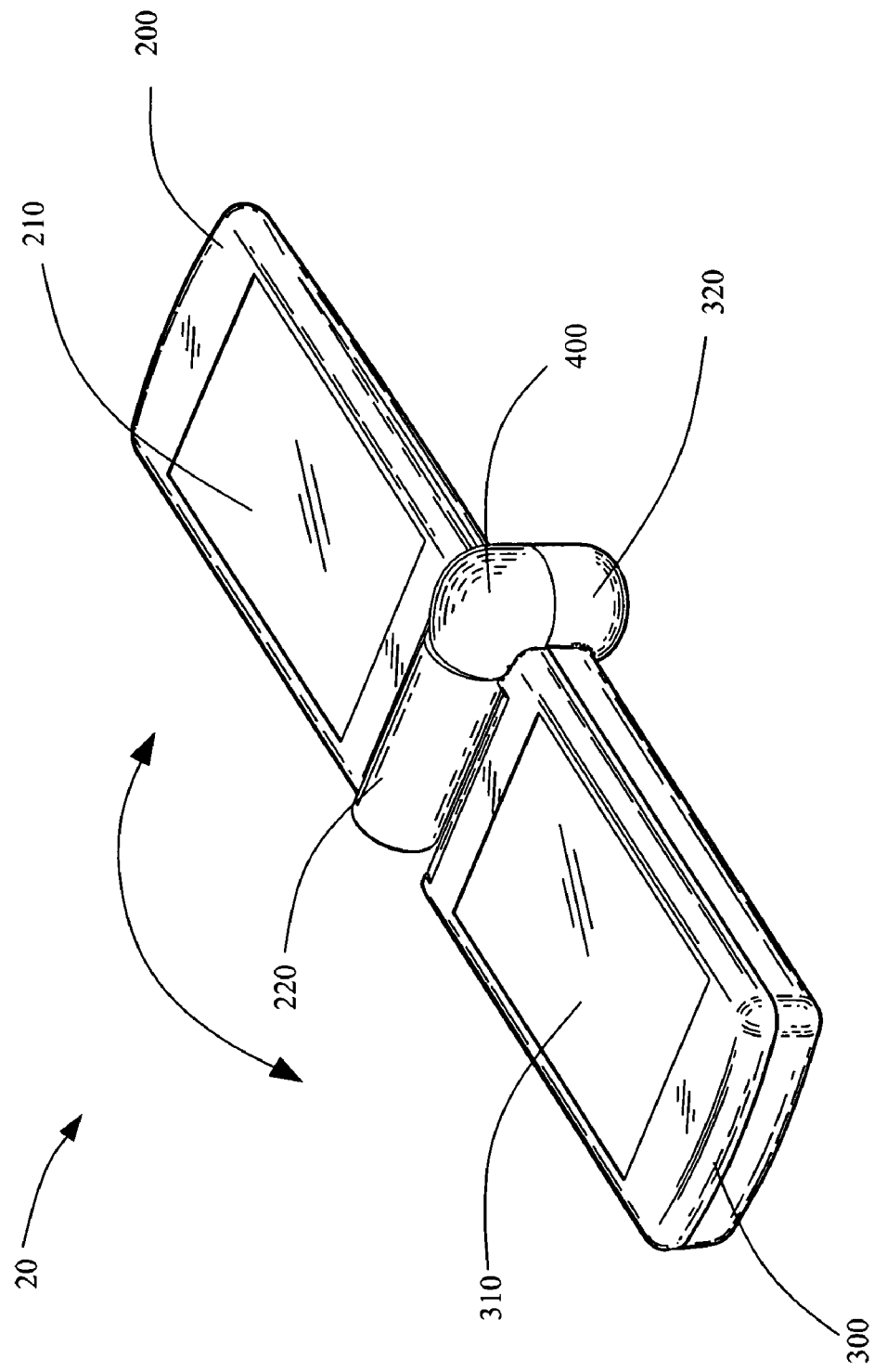
FIG. 7 is a perspective view of the mobile phone showing the cover being rotated vertically 180 degrees about a transverse axis.
Figure 8:
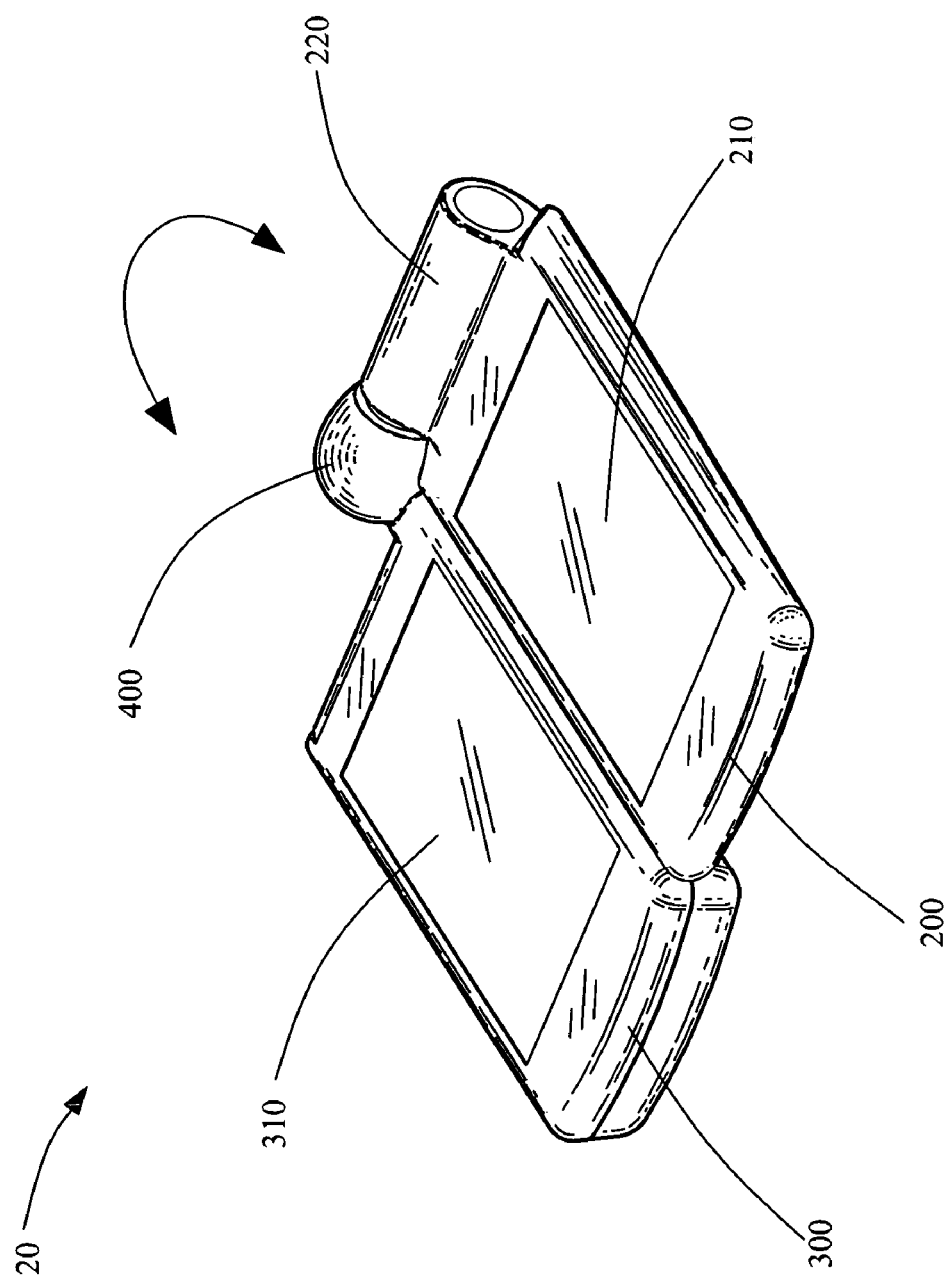
FIG. 8 is a perspective view of the mobile phone showing the cover being further rotated horizontally 180 degrees about a vertical axis to a position where the cover is side by side with the body.

To open the cover 200, the cover 200 is firstly rotated vertically 180 degrees about the transverse axis to a position where the cover 200 is coplanar with the body 300 as shown in FIG. 7. Then the cover 200 is rotated horizontally 180 degrees about the vertical axis to a position where the cover 200 is side by side with the body 300 as shown is FIG. 8. Thus the first display panel 210 and the second display panel 310 are arranged side by side to increase the area of display.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

What is claimed is:

1. A hinge adapted for rotationally coupling a cover and a body of a mobile phone about two perpendicular axes comprising:

a crankshaft having a transverse shaft and a vertical shaft extending perpendicularly from an end of the transverse shaft, the transverse shaft having a first keyed surface, the vertical shaft having a second keyed surface;

a first cam assembly disposed on the transverse shaft, the first cam assembly together with the transverse shaft being adapted to be assembled with said cover, the first cam assembly comprising:

a first cannular cam disposed on the transverse shaft, the first cannular cam having a third keyed surface on an outer wall thereof so as to be keyed to said cover;

a first cannular cam follower having a fourth keyed surface on an inner wall thereof, the first cannular cam follower being disposed on and keyed to the transverse shaft with the fourth keyed surface engaging with the first keyed surface; and a first resilient means disposed on the transverse shaft for resiliently biasing the first cannular cam and the first cannular cam follower into engagement; and a second cam assembly disposed on the vertical shaft, the second cam assembly together with the vertical shaft being adapted to be assembled with said body, the second cam assembly comprising:

a second cannular cam disposed on the vertical shaft and fixed to said body;

a second cannular cam follower having a fifth keyed surface on an inner wall thereof, the second cannular cam follower being disposed on and keyed to the vertical shaft with the fifth keyed surface engaging with the second keyed surface; and a second resilient means disposed on the vertical shaft for resiliently biasing the second cannular cam and the second cannular cam follower into engagement.

2. The hinge as claimed in claim 1, wherein the transverse shaft further has a first pedestal at the end joining to the vertical shaft, and the first resilient means is disposed between the first pedestal and the first cannular cam follower.

3. The hinge as claimed in claim 2, wherein the transverse shaft further has a first groove there-around at the end opposite to the first pedestal, and a first positioning spacer is wedged in the first groove and prop against the first cannular cam.

4. The hinge as claimed in claim 1, wherein the first resilient means is a spring.

5. The hinge as claimed in claim 1, wherein the vertical shaft further has a second pedestal at the end joining to the transverse shaft, a ring spacer and the second resilient means are disposed between the second pedestal and the second cannular cam follower.

6. The hinge as claimed in claim 5, wherein the vertical shaft further has a second groove there-around at the end opposite to the second pedestal, and a second positioning spacer is wedged in the second groove and prop against the second cannular cam.

7. The hinge as claimed in claim 1, wherein the second resilient means comprises a pair of resilient spacers.

8. A mobile phone comprising:

a cover having a first display panel and a first bearing, the first bearing defining a first cavity therein extending parallel with the first display panel;

a body having a second bearing at a corner thereof, the second bearing defining a second cavity therein extending perpendicular to the body; and a hinge rotationally coupling the cover and the body, the hinge comprising:

a crankshaft having a transverse shaft and a vertical shaft extending perpendicularly from an end of the transverse shaft, the transverse shaft having a first keyed surface, the vertical shaft having a second keyed surface;

a first cam assembly disposed on the transverse shaft, the first cam assembly together with the transverse shaft being retained by the first cavity of the cover, the first cam assembly including:

a first cannular cam having a third keyed surface on an outer wall thereof, the first cannular cam being disposed on the transverse shaft and keyed to the first cavity;

a first cannular cam follower having a fourth keyed surface on an inner wall thereof, the first cannular cam follower being disposed on and keyed to the transverse shaft with the fourth keyed surface engaging with the first keyed surface; and a first resilient means disposed on the transverse shaft for resiliently biasing the first cannular cam and the first cannular cam follower into engagement; and a second cam assembly disposed on the vertical shaft, the second cam assembly together with the vertical shaft being retained by the second cavity of the body, the second cam assembly including:

a second cannular cam disposed on the vertical shaft and fixed to the body;

a second cannular cam follower having a fifth keyed surface on an inner wall thereof, the second cannular cam follower being disposed on and keyed to the vertical shaft with the fifth keyed surface engaging with the second keyed surface; and a second resilient means disposed on the vertical shaft for resiliently biasing the second cannular cam and the second cannular cam follower into engagement.

9. The mobile phone as claimed in claim 8, wherein the body further has a second display panel thereon.

10. The mobile phone as claimed in claim 8, wherein the second cannular cam further has a pair of mounting legs for fixing the second cannular cam to the body.

11. The mobile phone as claimed in claim 8, wherein the first resilient means is a spring.

12. The mobile phone as claimed in claim 8, wherein the second resilient means comprises a pair of resilient spacers.

* * * * *